(12) United States Patent
Dice

(10) Patent No.: US 7,747,996 B1
(45) Date of Patent: Jun. 29, 2010

(54) METHOD OF MIXED LOCK-FREE AND LOCKING SYNCHRONIZATION

(75) Inventor: David Dice, Foxboro, MA (US)

(73) Assignee: Oracle America, Inc., Redwood Shores, CA (US)

( * ) Notice: Subject to any disclaimer, the term of this patent is extended or adjusted under 35 U.S.C. 154(b) by 1070 days.

(21) Appl. No.: 11/420,354

(22) Filed: May 25, 2006

(51) Int. Cl.
*G06F 9/44* (2006.01)

(52) U.S. Cl. .................. 717/169; 717/172; 717/108; 717/116; 717/106; 717/149; 711/163; 711/E12.039; 711/E12.094; 710/200

(58) Field of Classification Search ............... 717/169, 717/172, 108, 116, 10, 149; 711/163, 168, 711/147, E12.39, E12.094; 710/200, 52; 715/103, 105, 106, 107; 712/28; 713/375
See application file for complete search history.

(56) References Cited

U.S. PATENT DOCUMENTS

| | | | | |
|---|---|---|---|---|
| 5,608,893 | A * | 3/1997 | Slingwine et al. | 711/141 |
| 6,304,924 | B1 * | 10/2001 | Varma | 710/52 |
| 6,728,963 | B1 * | 4/2004 | Forin et al. | 719/310 |
| 6,965,905 | B2 * | 11/2005 | Garthwaite | 707/206 |
| 7,140,022 | B2 * | 11/2006 | Binns | 718/105 |
| 2001/0032281 | A1 * | 10/2001 | Daynes | 710/200 |
| 2004/0162948 | A1 * | 8/2004 | Tremblay et al. | 711/137 |
| 2005/0021567 | A1 * | 1/2005 | Holenstein et al. | 707/200 |
| 2005/0262301 | A1 * | 11/2005 | Jacobson et al. | 711/118 |
| 2006/0265704 | A1 * | 11/2006 | Holt | 717/169 |
| 2006/0288351 | A1 * | 12/2006 | Detlefs et al. | 718/107 |

OTHER PUBLICATIONS

Title: Lock-free synchronization for dynamic embedded real-time systems, author: Cho et al, source: ACM, publication date: Mar. 2006.*
Title: A scalable lock-free stack algorithm author: Hendler et al, source: ACM, publication date: Jun. 2004.*
Title: A scheduling mechanism for lock-free operation of a light-weight process library for SMP computers, author: Oguma H et al, source IEEE, publication date: Jun. 2001.*

* cited by examiner

*Primary Examiner*—Chameli C Das
(74) *Attorney, Agent, or Firm*—Martine Penilla & Gencarella, LLP

(57) ABSTRACT

A method to enabling interoperability of a locking synchronization method with a lock-free synchronization method in a multi-threaded environment is presented. The method examines a class file for mutable fields contained in critical code sections. The mutable fields are transferred to a shadow record and a pointer is substituted in the class field for each transferred mutable field. Code is altered so that the lock-free synchronization method is used if a lock is not held on the object. Atomic compare and swap operations are employed after mutable fields are updated during execution of the lock-free synchronization method.

20 Claims, 5 Drawing Sheets

METHOD OF MIXED LOCK-FREE AND LOCKING SYNCHRONIZATION

BACKGROUND

Multi-threaded programming provides the ability to divide program tasks into multiple threads which then can execute in parallel on a single processor through time slicing or execute in parallel on separate processors in a multi-processor computer system. In this way, program tasks can be executed quickly to accommodate large volumes of processing requests.

A problem can arise in multi-threaded computer environments when one or more threads of execution attempt concurrent operations to the same critical code section. In other words, the threads attempt simultaneous access to a shared data record which needs to be atomically updated so the data is left in a consistent state. Such an inopportune interleaving is commonly known as a race condition and will cause a program to fail or produce unexpected results. That is, the outcome of a task may show an unexpected critical dependence on the relative timing of when one thread accesses a critical code section over another thread which attempts to access the same critical code section. Synchronization methods are procedures which prevent or recover from such conditions. In general, synchronization can be accomplished using either a locking mechanism or a lock-free mechanism when providing thread access to critical code sections.

Locking synchronization methods by convention adhere to a locking model which permits only one thread at a time to acquire a lock and subsequently conduct processing operations within a critical code section. In the Java™ programming language, locking synchronization is accomplished with monitors to provide mutual exclusion to critical code sections. When a thread holds a lock to a critical code section, other threads attempting to access the critical code section will be paused and then placed in a waiting queue. After a thread holding a lock on an object completes processing operations involving the critical code section, the thread will release the lock. Another thread at the head of the waiting queue will be activated from the paused state, given the lock, and allowed to proceed with processing operations.

Lock-free synchronization as the name suggests does not adhere to a locking model and instead relies on an atomic update operation that guarantees that only one thread can ever make an update to a critical code section. If a second thread attempts to update a critical code section while a first thread is updating critical code, the first thread will succeed in its update operations while the second thread's attempt to update the critical code will fail. The second thread will restart its update attempt after the first thread completes update operations to the critical code section.

Because locking synchronization pauses threads and places them in a waiting queue for a lock to be released, processing throughput can suffer. Furthermore, if a thread holding a lock fails to complete processing, the program will fail to make progress and will become unresponsive. On the other hand, while lock-free synchronization methods often produce greater execution performance, lock-free synchronization methods are not always possible to implement for all critical codes sections. Ideally, program code should allow both methods to interoperate, that is, opportunistically attempt to use lock-free synchronization whenever possible but revert to locking synchronization as needed. Therefore, there is a need for a method which allows locking and lock-free synchronization methods to interoperate within a program executing in a multi-threaded computing environment.

SUMMARY

Embodiments of the present invention provide a method to enable interoperability of a locking synchronization method with a lock-free synchronization method in a multi-threaded environment.

It should be appreciated that the present invention can be implemented in numerous ways, such as a process, an apparatus, a system, a device or a method on a computer readable medium. Several inventive embodiments of the present invention are described below.

In one embodiment, a method enabling interoperability of a locking synchronization method with a lock-free synchronization method in a multi-threaded environment examines a class file of an object. The class file is examined for mutable fields being accessed within one or more critical code sections. After the class file is examined, mutable fields are transferred from the class to a shadow record. A pointer is substituted in the class to the shadow record. Then, code within the class file is altered to use the lock-free synchronization method to access mutable fields if a lock is not held on the object. Atomic compare and swap operations are then employed after mutable fields are updated during execution of the lock-free synchronization method.

In another embodiment, a method of interoperably executing a locking synchronization method with a lock-free synchronization method in a multi-threaded environment is presented. First, a determination is made whether a lock is held on an object prior to accessing a mutable field in a shadow record. Next, the lock-free synchronization method is utilized to access mutable fields in the shadow record when the lock is not held on the object. The lock-free synchronization method executes atomic compare and swap operations after mutable fields are updated.

In yet another embodiment, a system for enabling interoperability of a lock synchronization method with a lock-free synchronization method in a multi-threaded environment is provided. The system includes a bus, a memory, and a processor in communication with the memory through the bus. The processor is operable to execute instructions which allow the system examine a class file for mutable fields, transfer the mutable fields from the class file to a shadow record, alter code within the class file to use a lock-free synchronization method to access mutable fields if a lock is not held on the object, and employ a lock-free synchronization method which executes atomic compare and swap operations after mutable fields are updated.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

Figure 1A:
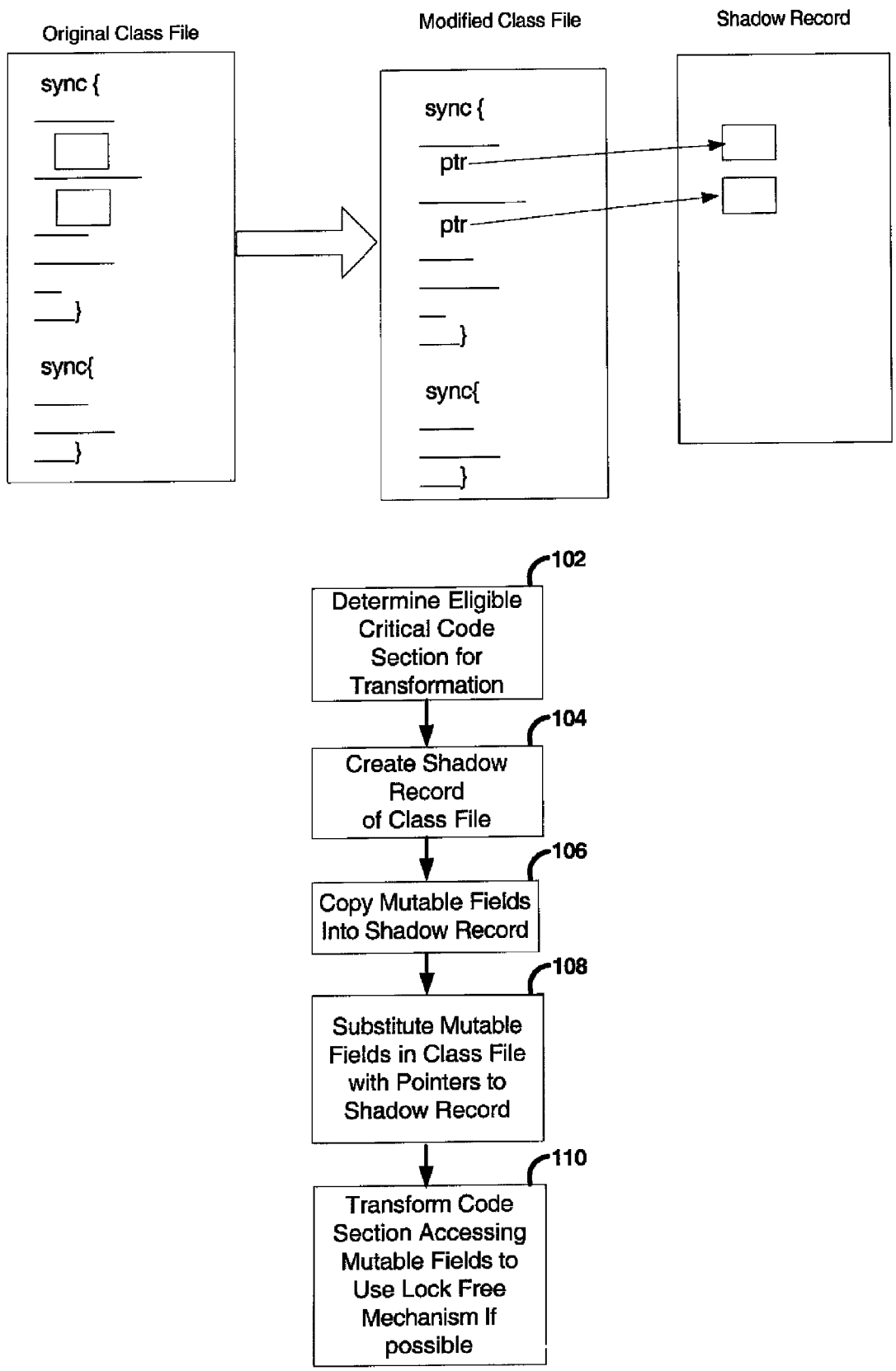
FIG. 1A is a flowchart and high level diagram of a code transformation procedure used in accordance with one embodiment of the present invention.

The present invention relates to transforming code so that a locking synchronization method and a lock-free synchronization method can interoperate in a program executing in a multi-threaded environment. The method allows locking and lock-free synchronization methods to interoperate without altering the behavior of the locking synchronization procedures. Utilizing this method allows transformed code to be executed with high performance lock-free synchronization whenever possible without risking inopportune interleavings of concurrent operations in code sections which can not utilize a lock-free synchronization method. The transformation operations lend themselves to being performed manually by developers as well as being performed by an automated tool or by a compiler.

It will be obvious, however, to one skilled in the art, that the present invention may be practiced without some or all of these specific details. In other instances, well known process operations have not been described in detail in order not to unnecessarily obscure the present invention.

Broadly speaking, the lock-free transform partitions an original class into an "anchor" class having the same name as the original class and serving as a replacement, and a shadow record. The shadow record contains all private instance fields that, with the sole exception of the constructor, are only stored into under the protection of the instance lock. The transform substitutes mutable fields in the original class with a single pointer to the anchor class that refers to the current shadow record. Typically, when the object is not otherwise locked, the object's mark word field points to the current shadow record. At any given time the anchor class is always associated one shadow record containing the current values of the displaced instance fields. Over the lifetime of the object different instances of the shadow record may be current. Obsolete and no longer current instances of the shadow record will be reclaimed automatically by a garbage collector of the multi-threaded runtime environment in which the program runs.

To perform a lock-free atomic update a set of mutable fields, the transformed code clones the current shadow record, applies the update or transaction to the clone, and then tries to install the updated copy as the current shadow record with an atomic compare-and-swap (CAS) instruction. If successful, the freshly installed copy becomes current shadow record for the object. All previous shadow records that were once current for the object are obsolete and will eventually become unreachable and reclaimed by a garbage collector.

Locking updates are performed in a manner which is predominantly unaltered. Locking and lock-free updates interoperate safely as both CAS into the object's mark field. For instance if object o is locked normally, a lock-free update will observe the locked mark and revert to normal and classic mutual exclusion mechanism. If the object becomes locked while a transaction is in-flight (between the fetch of the mark and CAS to install a new shadow record), the subsequent CAS will fail and the lock-free transaction will retry the operation with normal locking. Similarly, a lock-free update by thread T1 will fail if another lock-free update by T2 completes first and "beats" T1 to the CAS. Transformed synchronized blocks use lock-free updates where possible, but revert to locking if the lock is held.

FIG. 1A is a flowchart and high level diagram of a code transformation procedure used in accordance with one embodiment of the present invention. The method of the present invention begins with operation 102 in which a class file is examined first to see if critical code sections within the class file are eligible for transformation. As used herein, the term critical code section refers to code that accesses shared data or records. In other words, the operations that access the shared data may be referred to as critical code sections. Eligibility is determined by a conservative analysis. That is, if the analysis process does not have sufficient information to prove that a critical code section is eligible for transformation, the critical code section must be omitted from transformation and use locking synchronization at execution time. This can happen if the analysis occurs before all symbols and the call-graph in the critical code section are fully resolved. Broadly speaking, critical code is ineligible for transformation if it has any of the characteristics listed in Table 1.

TABLE 1

Critical Code Characteristics Ineligible for Lock-free Transformation stores to static fields
instance variables are non-private
calls wait( ), notify( ), or notifyall( ) methods
contains interminate or blocking code sections
changes an external state
   (for example modifying a file pointer)
contains nested non-instance synchronized blocks
calls non-instance synchronized methods
calls methods transitively that violate any
   of the above conditions Referring back to FIG. 1A, after a class file is examined to determine if it has at least one eligible critical code section, the method proceeds with operation 104. If the examined class file contains only ineligible critical code sections for the lock-free transformation, the class file would remain unaltered and subsequent operation steps to transform the code would not be performed.

In operation 104 a shadow record of the class file is created through processes well known to those skilled in the art. After the shadow record of the class file is created, the mutable fields of the class file are be copied into the shadow record in operation 106. In operation 108 pointers are substituted into the class file for each of the mutable fields that was transferred in operation 106.

In operation 110 code sections which access the mutable fields are transformed to use the lock-free synchronization method if possible. The availability of using a lock-free synchronization method to access a mutable field can be determined by having the code check the mark word field of an object before attempting to access the mutable field via the lock-free synchronization method. The mark word field contains synchronization metadata and is implicitly volatile. Run-time helper primitive operations can check to see if the value of the mark word field encodes a shadow record reference or if it encodes a thin lock or an inflated monitor. If the mark word field encodes a lock or a monitor, lock-free access to the mutable fields would not be possible and normal locking synchronization would be followed.

It should be understood that operations 102-110 in FIG. 1A illustrate one class file being transformed. Most programs of any complexity however, are composed of more than one class file and therefore operations 102-110 would be performed for each class file of the program. In this manner an entire program would be transformed to the greatest extent to utilize lock-free synchronization whenever possible.

Table 2 and 3 provide an example of a class file before and after being processed by the lock-free transformation method. Table 2 presents an exemplary class file with mutable fields in the class file. After the lock-free transformation methods of the present invention have completed, the exemplary class file is transformed into an anchor class and an associated shadow record. Table 3 presents the corresponding code for the anchor class and the associated shadow record once the lock-free transformation methods have completed transforming the exemplary class file of Table 2.

TABLE 2

Exemplary Class File Prior to Lock-Free Code Transformation

```
class Example1 {
//This example was explicitly contrived to illustrate various subtleties of
//the Lock-Free Code Transformation.
    private int mUpdateCounter ;    // mutable field protected by this
    private int mTally ;            // mutable field protected by this
    volatile int viv ;
    Example1( ) { viv = 1 ;}
// Data invariant: mUpdateCounter must be even when the lock is not held
// synchronized writer ...
    void Update (int Addend) {
      int a = viv ;
      synchronized (this) {
        assert (mUpdateCounter & 1) == 0 ;
        mUpdateCounter ++ ;
        mTally += Addend ;
```

TABLE 2-continued

Exemplary Class File Prior to Lock-Free Code Transformation

```
        mUpdateCounter ++ ;
        if ((mUpdateCounter & 0xF0) == 0) {
          a = 0 ;
        }
      }
      if (a == 0) viv = 1 ;
    }
// synchronized pure reader ...
    int PureReader ( ) {
      int Average ;
      synchronized (this) {
        assert (mUpdateCounter & 1) == 0 ;
        Average = (mTally * 2) / mUpdateCounter ;
      }
      return Average ;
    }
// simple get-set accessors.
// Note that the setter must be synchronized for the class to remain eligible.
    void get_mTally ( ) {
      return mTally ;    // GETFIELD
    }
    synchronized void set_mTally (int v)
      mTally = v ;       // PUTFIELD bytecode
    }
    void Ineligible ( ) {
      synchronized (this) {
        mTally += Integer.parseInt (System.in.readLine( )) ;
      }
    }
  }
```

TABLE 3

Exemplary Code after Lock-free Code Transformation process

```
class Example1 {
//The Lock-free Code Transform segregates all instance fields into either the shadow
record or the Anchor class. The Anchor class bears the same as the original class. The
shadow record contains private instance fields that may be stored into under the "this"
instance lock.
    static class Shadow_Record {         // Mutable Section - writable partition
      int mTally ;           // N-Tuple of values
      int mUpdateCounter ;
      Shadow_Record (Shadow_Record m) {    // Construct a replica of m
        this.mTally      = m.mTally;
        this.mUpdateCounter = mUpdateCounter;
      }
    }
    private volatile Shadow_Record CurrentMS ;   // Used when object is locked
    static private final AtomicReferenceFieldUpdater<Example1, Shadow_Record>
casMS =
        AtomicReferenceFieldUpdater.newUpdater (Example1.class,
Shadow_Record.class, "CurrentMS") ;
    static private final AtomicReferenceFieldUpdater<Example1, MarkType> casMark
=
        AtomicReferenceFieldUpdater.newUpdater (Example1.class, MarkType.class,
"mark") ;
    volatile int viv ;
    Example( ) {
      this.mark   = MutableToMark(new Shadow_Record( ));
      this.CurrentMS = null ;
      viv = 1 ;
    }
// We assume a slightly extended dialect of Java and Java libraries augmented with the
//following features:
//1. For ease of exposition we assume the dialect provides "goto".
//2. Direct access to the implementation-specific mark, addressed via this.mark. The
//mark field is implicitly volatile. Alternately, access to the mark could be provided via
//the JVM's private "Unsafe" facility.
//3. A suite of run-time helper primitives:
//-LockOwner( ) returns a a reference to the thread that owns an object.
//-IsMutable( ) returns true FF the mark value encodes a Shadow_Record references,
//otherwise the mark encodes a thin lock or inflated monitor and IsMutable( ) returns
```

TABLE 3-continued

Exemplary Code after Lock-free Code Transformation process

```
//false.
//-MarkToMutable( ) extracts the Shadow_Record pointer from a mark word
//-MutableToMark( ) constructs a Shadow_Record-bearing mark value Typical
//implementations of MarkToMutable and MutableToMark would simply mask (AND),
//OR, or XOR bits into or out of the mark value.
//-EncodeLocked( ) returns a mark encoded as locked by the thread.
        void Update (int Addend) {
            int a = viv ;
//*** Start of transformed critical section ***
//Wrapper for the synchronized block. The language transform facility will select a
//name "Retry" that does not conflict with any labels appearing in the user's code.
            Retry:
//STEP 1: fetch the mark value.
            MarkType w = this.mark ;
            if (IsMutable(w)) {
                m = MarkToMutable(w) ;
                assert m != null ;
//"a" is updated in the body of the synchronized block so we make make a copy of "a".
                Type copy_a = a ;
                try {
//Cover the body of the synchronized block with a try-catch in case code within the
//block generates exceptions, explicitly executes throw( ), returns, break <LABEL>,
//break, or continue.
//STEP 2: clone the mutable section of the object
                    Shadow_Record c = new Shadow_Record(m) ;
//STEP 3: Execute the specified transaction on the cloned copy "c". What follows is
//precisely the code in the synchronized( ) {...} block in Update( ), except that we apply
//the changes to "c".
                    assert (c.mUpdateCounter & 1) == 0
                    c.mUpdateCounter ++ ;
                    c.mTally += Addend ;
                    c.mUpdateCounter ++ ;
                    if ((c.mUpdateCounter & 0xF0) == 0) {
                        copy_a = 0 ;      // [2]
                    }
                } finally {
//STEP 4: attempt to "swing" the candidate c into the mark. Try to commit "c" as the
//current Shadow_Record. A successful CAS makes the changes visible en-mass.
                    if (!casMark.compareAndSet (this, w, MutableToMark(c))) {
//Interference - this.mark changed which indicates that either another lock-free update
//committed, or that the object became traditionally locked. In either case this thread
//simply discards "c" and retries the operation
                        goto Retry ;
                    }
//Success - now commit changes to local variables. Copy-back from copy_a to the real
//local variable "a" master copy. Instead of copy-back we could save "a" as above,
//change the transaction to update "a" proper at [2], above, and then restore "ai" by
//means of {a = copy_a} if the CAS fails. That is, instead of copy-back after a
//successful transaction, the transformed code would save the value of "a" prior to the
//transaction and update "a" in-place in the transaction code. If the subsequent CAS
//failed the wrapper would "undo" the update to "ai" by restoring the previously saved
//value. Local variables are by definition thread-local so there is no risk of concurrent
//access. (Java local variables are only addressable in the frame where they were
//instantiated by the thread that created the activation record).
//STEP 5: adjust local variables as needed
                    a = copy_a;
                    // successful fast-path exit. Typically, control will reach here
                }
//Conceptually, any pending control flow from the original synchronized block, such as
//return, break L, break, throw, or exceptions will be recognized at this point. Javac sees
//to that.
//*** End of transformed critical section ***
            } else {
//The object is classically locked. Lock-Free updates are not possible in this
//circumstance. We have to obey the mutual-exclusion protocol. For the purpose of
//exposition we use a spin-lock. The contending thread spins until the object becomes
//unlocked. In practice, however, this thread, which is contending for ownership of the
//lock, would use a spin-then-block contention management policy. Revert to
//synchronization by mutual-exclusion. Augmented MONITORENTER operation - the
//semantics are the same as MONITORENTER except that it transfers control to Retry if
//it observes a Mutable pointer installed in the mark. This variant will never overwrite a
//MutablePointer that appears in this.mark
                boolean IsNested = false ;
                for(;;) {
                    MarkType w = this.mark ;
                    If (IsMutable(w)) goto Retry ;   // retry lock-free update
```

TABLE 3-continued

Exemplary Code after Lock-free Code Transformation process

```
//It appears unlocked - try to acquire the lock
          if (IsLocked(w)) {
             if (LockOwner(w) == Thread.currentThread( )) {
             IsNested = true ; break ;
             } else {
                continue ;     // contention: spin or spin-then-block
             }
          }
          v = EncodeLocked (w, Thread.currentThread( )) ;
          if (casMark.compareAndSet (this, w, v)) break ;
       }
       Mutable m = this.CurrentMS ;
       assert m != null ;
//{{{{{{{{{{{{{{{{{
       m.mUpdateCounter ++ ;
       m.mTally += Addend ;
       m.mUpdateCounter ++ ;
//}}}}}}}}}}}}}}}
//MONITOREXIT equivalent - Release the lock, potentially reinstalling this.CurrentMS
//into this.mark.
          if (!IsNested) {
             this.mark = EncodeUnlocked (w) ;
          }
       }
       if (a == 0) viv = 1 ;
    }
    int PureReader ( ) {
       int Average ;
//*** Start of transformed critical section ***
//Wrapper for the synchronized block.
       Retry:
       MarkType w = this.mark ;
       if (IsMutable(w)) {
          Mutable m = MarkToMutable(w) ;
          assert m != null ;
          Average = (m.Tally * 2) / m.UpdateCounter ;
       } else {
//The object is classically locked. Lock-Free updates are not possible in this
//circumstance. We have to obey the mutual-exclusion protocol.
          boolean IsNested = false ;
          for (;;) {
             MarkType w = this.mark ;
             if (IsMutable(w)) goto Retry ;    // retry lock-free update
//It appears unlocked - try to acquire the lock
             if (IsLocked(w)) {
                if (LockOwner(w) == Thread.currentThread) {
                   IsNested = true ; break ;
                } else {
                   continue ;     // Contention: spin or block
                }
             }
             v = EncodeLocked (w, Thread.currentThread( )) ;
             if (casMark.compareAndSet (this, w, v)) break ;
          }
          Mutable m = this.CurrentMS ;
          assert m != null ;
          try {
//{{{{{{{{{{{{{{{{{
             Average = (m.Tally * 2) / m.UpdateCounter ;
//}}}}}}}}}}}}}}}
          } finally {
//Release the lock, potentially reinstalling this.CurrentMS into this.mark.
             if (!IsNested) {
                this.mark = EncodeUnlocked (w) ;
             }
          }
       }
//*** End of transformed critical section ***
       return Average ;
    }
//Unsynchronized GETFIELD accessor
    void get_mTally ( ) {
//Note that unsynchronized get_mTally( ) uses the same idiom as the pure synchronized
//Reader( ) method.
       Retry:
       MarkType w = this.mark ;
       if (IsMutable(w)) {
```

TABLE 3-continued

Exemplary Code after Lock-free Code Transformation process

```
            return MarkToMutable(m).mTally ;
      } else {
            Mutable m = this.CurrentMS ;
//Wait for the lock owner to transfer the Mutable pointer from this.mark to
//this.CurrentMS.
            if (m == null) goto Retry ;
            return m.mTally ;
      }
   }
   void set_mTally ( ) {
//*** Start of transformed critical section ***
//Wrapper for the synchronized block.
      Retry:
//STEP 1: fetch the mark value.
      MarkType w = this.mark ;
      if (IsMutable(w)) {
         m = MarkToMutable(w) ;
         assert m != null ;
         try {
//Cover the body of the synchronized block with a try-catch block.
//STEP 2: clone the mutable section of the object
            Shadow_Record c = new Shadow_Record(m) ;
//STEP 3: Execute the specified transaction on the cloned copy "c".
            c.mTally = v ;
         } finally {
//STEP 4: attempt to "swing" the candidate c into the mark
//Try to commit "c" as the current Shadow_Record.
            if (!casMark.compareAndSet (this, w, MutableToMark(c))) {
//Interference - this.mark changed - retry.
               goto Retry ;
            }
//successful fast-path exit. Typically, control will reach here
         }
      } else {
//The object is classically locked.
//MONITORENTER
         boolean IsNested = false ;
         for (;;) {
            MarkType w = this.mark ;
            If (IsMutable(w)) goto Retry ; // retry lock-free update
//It appears unlocked - try to acquire the lock
            if (IsLocked(w)) {
               if (LockOwner(w) == Thread.currentThread( ) {
                  IsNested = true ; break ;
               } else {
                  continue ;       // spin
               }
            }
            v = EncodeLocked (w, Thread.currentThread( )) ;
            if (casMark.compareAndSet (this, w, v)) break ;
         }
         Mutable m = this.CurrentMS ;
         assert m != null ;
//{{{{{{{{{{{{{{{{
            m.mTally = v ;
//}}}}}}}}}}}}}}}}
//MONITOREXIT equivalent -
         if (!IsNested) {
            this.mark = EncodeUnlocked (w) ;
         }
      }
   }
   void Ineligible ( ) {
//The synchronized block Ineligible( ) is ineligible to be commuted to lock-free mode as
//readLine( ) may block and will update external file pointers.
//MONITORENTER (this)
      for (;;) {
         MarkType w = this.mark ;
         if (IsMutable(w)) {
            v = EncodeLocked (w, Thread.currentThread( )) ;
            if (casMark.compareAndSwap (this, w, v)) {
               assert this.CurrentMS == null ;
               this.CurrentMS = MarkToMutable(w) ;
               break ;
            }
            continue ;
         }
         if (IsLocked(w)) continue ;   // spin or block
```

TABLE 3-continued

Exemplary Code after Lock-free Code Transformation process

```
              v 32 EncodeLocked (w, Thread.currentThread( ));
              if (casMark.compareAndSwap (this, w, v)) {
                 assert this.CurrentMS != null ;
                 break ;
              }
          }
       }
       try {
//{{{START of critical section body
           this.CurrentMS.mTally += Integer.parseInt (System.in.readLine( )) ;
//}}} END od critical section body
       } finally {
//MONITOREXIT (this) ;
           Mutable v      = this.CurrentMS ;
           assert v != null ;
           this.CurrentMS = null ;
//The Shadow_Record changed.
//We clone the Shadow_Record when unlocking so that any lock-free operation that
//happens to be in progress will fail when it attempts to compareAndSet( ) the mark. If
//we simply restored "v" into this.mark a stalled lock-free update could successfully
//CAS over "v", //even though the Shadow_Record had been changed in the critical
//section above.
           this.mark      = MutableToMark (new Mutable(v)) ;
       }
    }
 }
```

Instances of the transformed class file and the shadow record as illustrated by Table 3, operate normally with other program segments operating in a multi-threaded environment. The transformed class file and shadow record instances can be stored and can be accessed through a physical memory or a virtual memory. The lock-free transformation methods work equally well for locking and lock-free synchronization methods executing within a virtual machine or for synchronization methods which are conventionally compiled and executed in a computing environment which does not execute within a virtual machine. Although the examples provided by Tables 2 and 3 were presented in the Java™ language, this is only illustrative and not meant to restrict the lock-free transformation methods to only Java™ programs. Furthermore, for ease of exposition the example shown below shows source code to source code transformations. In one embodiment the lock-free transform is integrated into the bytecode-to-native code step performed by a JIT compiler.

Figure 1B:
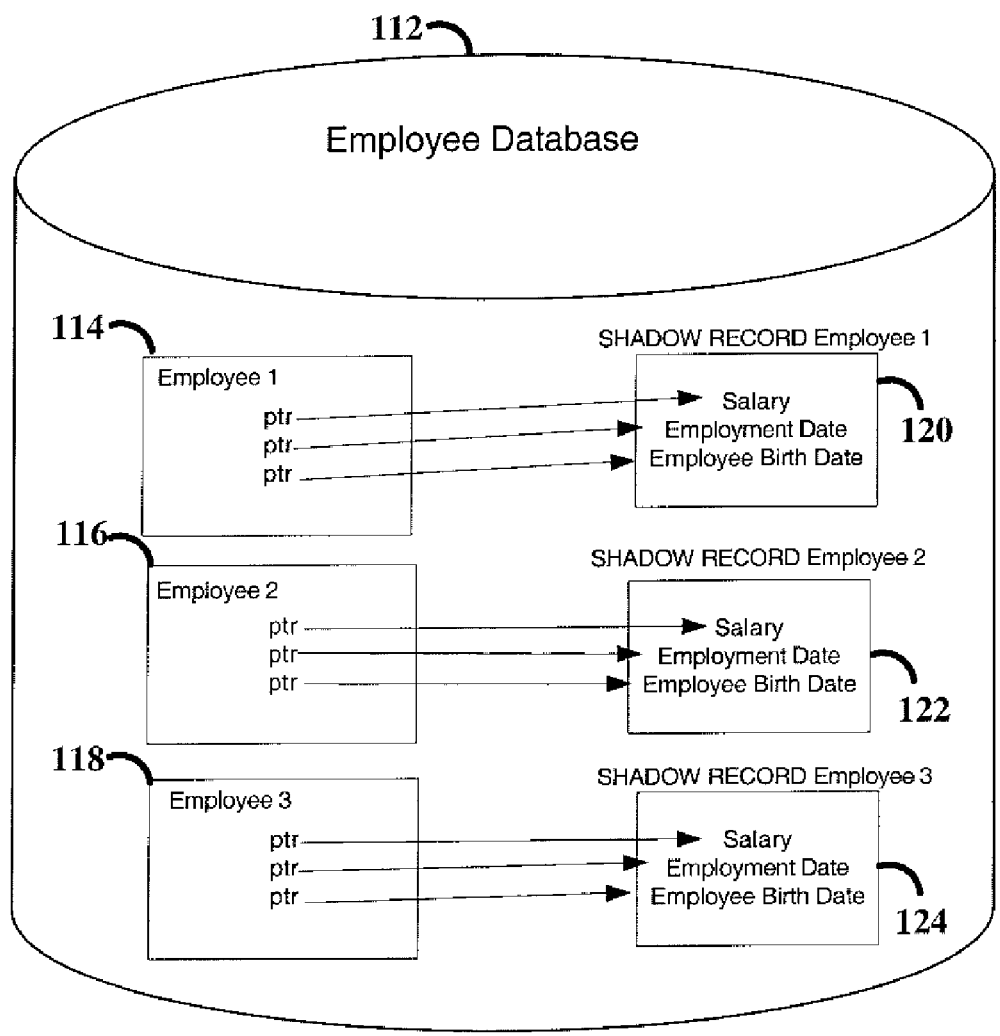
FIG. 1B is an illustrative diagram of class instances and corresponding shadow record instances in accordance with one embodiment of the present invention.

After all eligible code sections are transformed in the program, the program will normally begin processing operations. These processing operations will include creating instances of the class files. FIG. 1B is an illustrative diagram of class instances and corresponding shadow record instances within the context of an executing database program storing employee information. In this example, employee database 112 contains the information for several employees. Each employee record is an operating instance of a class file which has been transformed by the methods of the present invention. As such, employee instances 114, 116, 118 each contain pointers which point to mutable fields in corresponding shadow record instances. As seen in FIG. 1B, employee instance 114 containing information for employee 1 has pointers which all point to the mutable fields contained in shadow record instance 120 for employee 1. When the records for the employee instances are updated through lock-free synchronization, the update procedure illustrated in FIG. 2 is followed.

Figure 2:
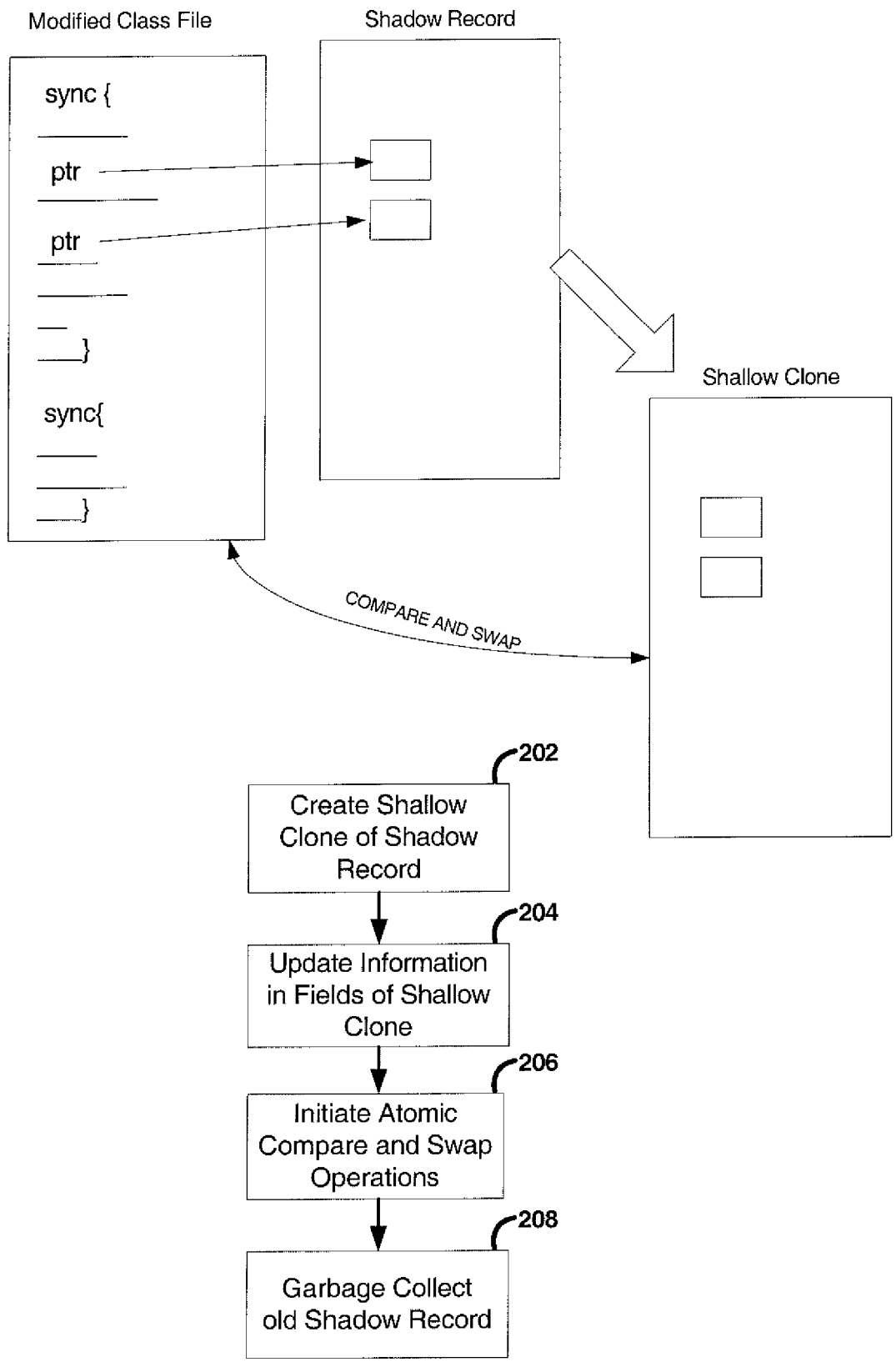
FIG. 2 is a flowchart and high level diagram of a lock-free access procedure utilizing atomic compare and swap operations in accordance with one embodiment of the present invention.

FIG. 2 is a flowchart and high level diagram of a lock-free access procedure utilizing atomic compare and swap operations in accordance with one embodiment of the present invention. It should be understood that if a pure reader method attempts to access a mutable field, atomic compare and swap operations do not need to be employed because the values of the mutable fields will remain unchanged by the method accessing them. Therefore, FIG. 2 illustrates conditions when updates are to be made to the mutable fields of a shadow record.

In operation 202 a shallow clone of the shadow record is created for each thread attempting to update a mutable field of the shadow record. As is well known by those skilled in the art, a shallow clone is a duplicate of a file or record that is created in a manner such that an individual copy of instance field values of the original file or record is not created for the duplicate file or record.

Operation 204 proceeds in which a thread updates fields in the shallow clone. After the updates are made, the thread will attempt to initiate atomic compare and swap operations. If the atomic compare and swap operation succeeds, the shallow clone will be installed as the new shadow record for the class file instance.

In a multi-threaded environment two or more threads may attempt to update mutable fields in the shadow record. However, because compare and swap operations are atomic, only one thread will succeed while successive threads will fail in their attempt to complete the compare and swap operations. Failing threads will have to reattempt their updates operations utilizing the newly installed shadow record.

As was discussed above, when a thread succeeds in the atomic compare and swap operation, it will be installed as the new shadow record for the class file instance. In operation 208 the old shadow record will be garbage collected through the normal process of the multi-threaded environment. In this way memory allocated to the previous shadow record will be reclaimed by the computing system.

Figure 3:
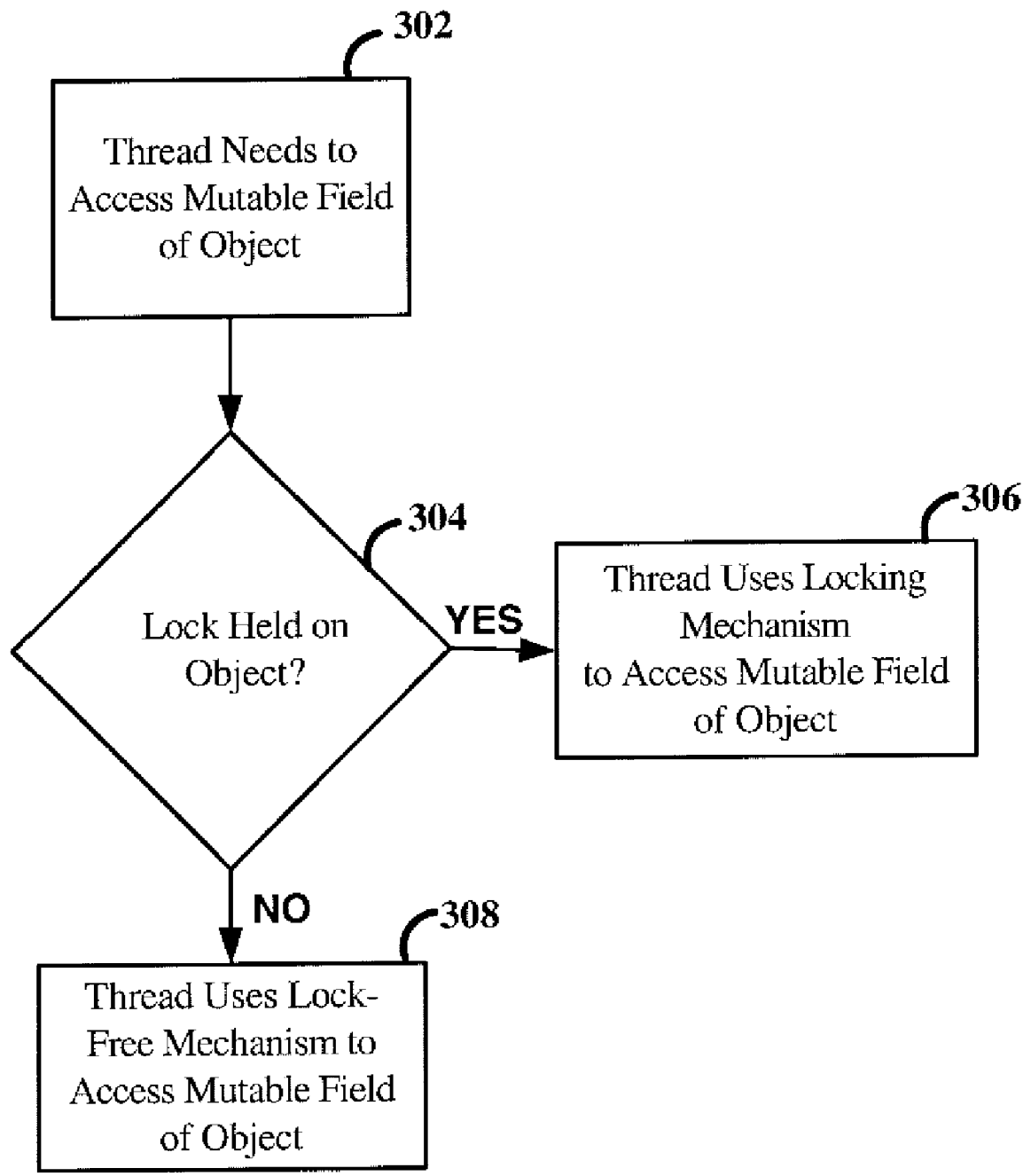
FIG. 3 is a flowchart illustrating operations determining the synchronization method used when accessing mutable fields of an object in accordance with one embodiment of the present invention.

Because both a locking synchronization method and a lock-free interoperate within the multi-threaded environment with the transformed code, threads must determine which locking synchronization method to use before accessing a mutable field. FIG. 3 is a flowchart illustrating operations determining the synchronization method used when accessing mutable fields of an object. In operation 302 a thread in its processing operations needs to access the mutable field of an object instance. A determination is made prior to attempting the access whether a lock is held on the object instance in operation 304. As previously discussed, the mark word field of an object can provide an indication whether a lock is held on an object. If a lock is not held on an object, operation 308 will proceed and the thread will utilize the lock-free synchronization method to gain access to the mutable fields. If a lock is held on the operation 306 will commence in which the thread will use the conventional locking synchronization method.

Figure 4:
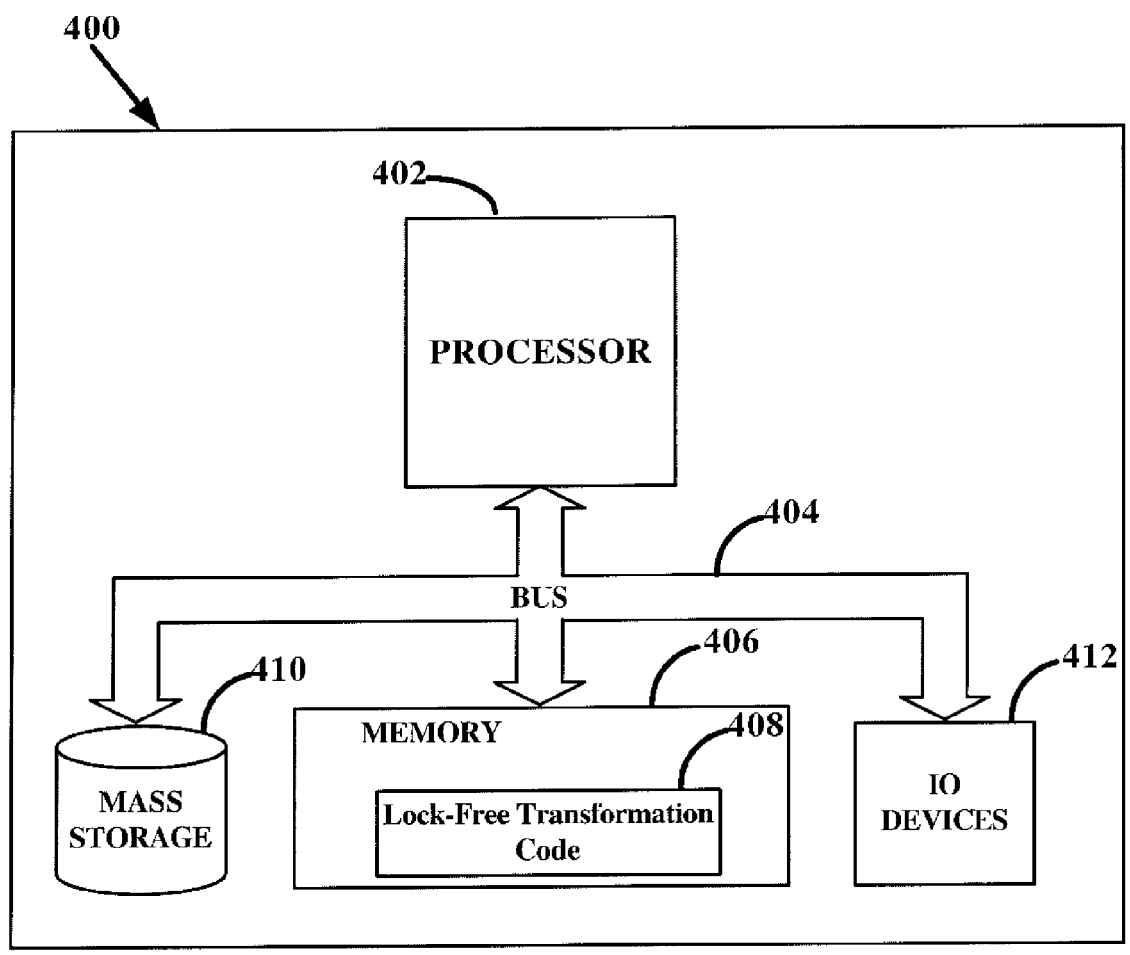
FIG. 4 is a high level diagram of a system operable to utilize lock-free transformation code in accordance with one embodiment of the present invention.

FIG. 4 is a high level diagram of a system operable to utilize lock-free transformation code in accordance with one embodiment of the present invention. System 400 is comprised of Processor 402, Bus 404, Memory 406, Technology Independent Delay Logic Code 408, Mass Storage 410 and IO Devices 412. Processor 402 communicates with Memory 406, Mass Storage 410 and IO Devices 412 through Bus 404. IO Devices 412 can comprise one or more IO devices. Memory 406 further includes Lock-Free Transformation Code 408. System 400 is configured such that Processor 402 receives instructions from the Lock-Free Transformation Code 408 which enables a program to be transformed so that locking and lock-free synchronization methods interoperate within a multi-threaded environment. Lock-Free Transformation Code 408 conforms with the embodiments illustrated in the previous figures.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method enabling interoperability of a locking synchronization method with a lock-free synchronization method in a multi-threaded environment, comprising method operations of:
    examining a class file of an object for mutable fields, the mutable fields being contained within one or more critical code sections of the class file;
    transferring the mutable fields from the class file to a shadow record, the transferring substituting a pointer in the class file for each mutable field transferred to the shadow record;
    altering code within the class file to use the lock-free synchronization method to access mutable fields if a lock is not held on the object, and
    employing atomic compare and swap operations after mutable fields are updated during execution of the lock-free synchronization method.

2. The method of claim 1 wherein, the lock-free synchronization method creates a shallow clone of the shadow record so that mutable fields in the shallow clone of the shadow record are updated prior to execution of atomic compare and swap operations.

3. The method of claim 1 wherein, the altering code within the class file utilizes a mark word field of the object to determine if the lock is held on the object.

4. The method of claim 1 wherein, both the class file and the shadow record are stored within a virtual memory.

5. The method of claim 1 wherein, the locking synchronization method utilizes a monitor to provide mutual exclusion to critical code sections.

6. The method of claim 1 wherein, the locking synchronization method and the lock-free synchronization method execute within a virtual machine.

7. The method of claim 1 wherein, method operations are embodied in code segments stored on a computer-readable medium.

8. A method of interoperably executing a locking synchronization method with a lock-free synchronization method in a multi-threaded environment, comprising method operations of:
    determining whether a lock is held on an object prior to accessing a mutable field in a shadow record; and
    utilizing the lock-free synchronization method to access mutable fields in the shadow record when the lock is not held on the object, the lock-free synchronization method executing atomic compare and swap operations after mutable fields are updated.

9. The method of claim 8 wherein, the lock-free synchronization method creates a shallow clone of the shadow record so that mutable fields in the shallow clone of the shadow record are updated prior to execution of atomic compare and swap operations.

10. The method of claim 8 wherein, the determining uses a mark word field of the object to determine if the lock is being held on the object.

11. The method of claim 8 wherein, both the class file and the shadow record are stored within a virtual memory.

12. The method of claim 8 wherein, locking synchronization method utilizes a monitor to provide mutual exclusion to critical code sections.

13. The method of claim 8 wherein, pointers in a class file of the object which reference mutable fields in the shadow record are updated when the lock-free synchronization method executes atomic compare and swap operations.

14. A system for enabling interoperability of a lock synchronization method with a lock-free synchronization method in a multi-threaded environment comprising:
- a bus;
- a memory;
- a processor in communication with the memory, through the bus, the processor operable to receive instructions which, when executed by the processor, cause the processor to perform a method comprising:
    - examining a class file of an object for mutable fields, the mutable fields being contained within one or more critical code sections of the class file;
    - transferring the mutable fields from the class file to a shadow record, the transferring substituting a pointer in the class file for each mutable field transferred to the shadow record;
    - altering code within the class file to use a lock-free synchronization method to access mutable fields if a lock is not held on the object, and
    - employing a lock-free synchronization method which executes atomic compare and swap operations after mutable fields are updated.

15. The system of claim 14 wherein, the lock-free synchronization method creates a shallow clone of the shadow record so that mutable fields in the shallow clone of the shadow record are updated prior to execution of atomic compare and swap operations.

16. The system of claim 14 wherein, the altering code within the class file utilizes a mark word field of the object to determine if the lock is held on the object.

17. The system of claim 14 wherein, both the class file and the shadow record are stored within a virtual memory.

18. The system of claim 14 wherein, locking synchronization method utilizes a monitor to provide mutual exclusion to critical code sections.

19. The system of claim 14 wherein, the locking synchronization method and the lock-free synchronization method execute within a virtual machine.

20. The system of claim 14 wherein the system is an enterprise server system.

* * * * *